E. S. CHAPELL.
Pipe-Coupling.
No. 196,875.　　　　　Patented Nov. 6, 1877.
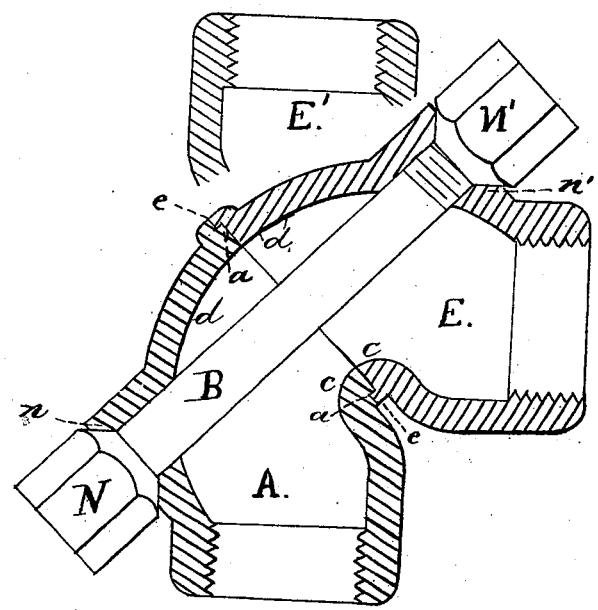
Witnesses.
C. H. Kilburn
R. D. Chapell
Inventor.
Elisha S. Chapell.

UNITED STATES PATENT OFFICE.

ELISHA S. CHAPELL, OF SOUTH BOSTON, MASSACHUSETTS.

IMPROVEMENT IN PIPE-COUPLINGS.

Specification forming part of Letters Patent No. 196,875, dated November 6, 1877; application filed April 17, 1877.

*To all whom it may concern:*

Be it known that I, ELISHA S. CHAPELL, of South Boston, in the county of Suffolk and State of Massachusetts, have invented certain new and useful Improvements in Pipe-Couplings; and I do hereby declare that the following is a full, clear, and exact description thereof, which will enable others skilled in the art to which it appertains to make and use the same, reference being had to the accompanying drawings, which form a part of this specification.

This invention consists in the construction and arrangement of an adjustable pipe-coupling, as hereinafter more fully described, and pointed out in the claim.

The figure on the drawing represents a sectional view, from which it will be seen that my coupling is made in two parts, lettered, respectively, A and E. These parts consist of short ends of pipe, screw-threaded to receive the pipes that are to be connected, and curved, as shown at *c d*, in order to give the joint a better and more compact shape. The ends of the parts A E are cut off diagonally, and the diagonal sides are faced together and ground to a seat, the flange *e* fitting into an annular recess, *a*, in A, as shown. B is a bolt, which passes through the pieces A and E diagonally, and is provided with screw-threads at each end, on which are screwed the nuts N N'. These nuts are made conical, and fit into conical seats *n n'*, cast on the parts A and E of the coupling.

By loosening one or both of the nuts N N', either of the two parts may readily be turned around bolt B, and by turning one of the parts a one-half revolution it will assume the position indicated by the fragment E' on the drawing. After the parts have been arranged in the proper position, they are secured by tightening the nuts N N' in their seats.

This coupling is simple in construction, and therefore strong and durable. It admits of the two sections of pipe being placed at any angle to each other from ninety to one hundred and eighty degrees, or a straight line, and, its parts being so few and simple, it is not liable to leak or get out of order. It also admits of being easily loosened when required, and admits of either of the two sections A and E being turned or rotated around bolt B one complete revolution, or a number of continuous revolutions in the same direction—that is to say, the section E, with its pipe or nozzle inserted, having been turned, for example, into the position represented by E', it may be brought back into its original position by continuing the rotation in the same direction so as to describe a complete circle, which is not the case with any of the pipe-couplings with which I am acquainted.

Having thus described my invention, I claim and desire to secure by Letters Patent of the United States—

The improved adjustable pipe-coupling herein described, consisting of two parts, A E, curved at *c d*, and having diagonally cut-off ends, facing each other, the parts being provided with conical seats *n n'*, and united by the screw-threaded bolt B and conical cap-nuts N N', substantially as and for the purposes herein shown and specified.

In testimony that I claim the foregoing as my own I have hereto affixed my signature in presence of two witnesses.

ELISHA S. CHAPELL.

Witnesses:
 CHAS. H. KILBURN,
 R. D. CHAPELL.